United States Patent [19]

Strauss

[11] 4,294,542
[45] Oct. 13, 1981

[54] METHOD AND APPARATUS FOR COUNTING SMALL OBJECTS SUSPENDED IN A LIQUID STREAM

[75] Inventor: Gary M. Strauss, Kent, Wash.

[73] Assignee: Weyerhaeuser Company, Tacoma, Wash.

[21] Appl. No.: 104,596

[22] Filed: Dec. 17, 1979

[51] Int. Cl.$^3$ .................. B65G 51/36; G06M 7/00
[52] U.S. Cl. .................. 356/339; 235/92 PC; 235/92 PK; 250/221
[58] Field of Search .......... 356/336, 338, 339, 341; 250/221, 222 R, 222 PC, 574; 235/92 PC, 92 PK

[56] References Cited

U.S. PATENT DOCUMENTS

| | | | |
|---|---|---|---|
| 3,028,501 | 4/1962 | Lamparter | 250/222 P |
| 3,849,002 | 11/1974 | Hach | |
| 3,879,129 | 4/1975 | Inoue | |
| 3,900,718 | 8/1975 | Seward | 235/92 PC |
| 4,046,996 | 9/1977 | Williams et al. | 235/92 PK |

OTHER PUBLICATIONS

Gam Rad Fluid Analyzer, Model 260, Gam Rad Inc., 16825 Wyoming Ave., Detroit, MI 48221.

*Primary Examiner*—R. A. Rosenberger
*Attorney, Agent, or Firm*—Weyerhaeuser Company

[57] ABSTRACT

The present invention is a method and apparatus for counting discrete small objects suspended in a liquid stream. It comprises a source of flowing liquid having sufficient known velocity to maintain the objects in suspension, a means for introducing the objects into the liquid stream, and a calibrated turbidity measuring device. The outflow may be automatically shifted from one receiving means to another when a predetermined object count is reached. The method is particularly useful when counting living objects, such as fish fry or post-larval shrimp, since it eliminates the trauma of handling and is much faster than hand counting.

17 Claims, 2 Drawing Figures

METHOD AND APPARATUS FOR COUNTING SMALL OBJECTS SUSPENDED IN A LIQUID STREAM

BACKGROUND OF THE INVENTION

The present invention relates to a method and apparatus for counting discrete small objects suspended in a flowing liquid.

There are well-developed systems for counting small objects of regular shape in dry systems. An example might be in packaging such items as screws, ball bearings, etc., which are more conveniently sold by number than by weight. This is usually done by singulating the objects on a conveyor and sensing them by means such as a photocell, magnetic transducer or the like. Objects that must be maintained wet or in a liquid present different and largely unaddressed problems of counting. Equipment is available for determining concentrations of relatively small percentages of extremely fine suspended particles. However, there has not been any wet system which gives a number count of anything that might be described as being of discrete object size.

While the counting problem described above occurs in many situations, one particular industry where it is of importance is aquaculture. Aquaculture may be defined as the cultivation of any animal living in an aquatic environment.

Fish eggs and fish fry are examples of products that are usually marketed by numbers. Most often the number count is merely an approximation based on volumetric or weight estimates.

Another product also sold commercially by number count is immature freshwater shrimp, often of the species *Macrobrachium rosenbergii*. These are shipped from hatcheries in a post-larval state when they are about 1 centimeter in length and weigh between 0.01 and 0.03 gram. Before the present invention, it was standard practice to count these delicate, squirming little creatures by hand. This is an expensive, tedious and time-consuming operation which is traumatic to the delicate crustaceans, often inducing considerable mortality. In addition, it does not give the accuracy that might be expected. At best, hand counting gives values which are probably in a range of ±5 percent of true counts.

As an example of existing technology, U.S. Pat. No. 3,879,129 to Inoue discloses a light scattering means for measuring the size and concentration of small particles up to diameters of several hundred microns. This method is apparently not effective with particles in the millimeter and larger size range; however, nor does it give a number count.

SUMMARY OF THE INVENTION

The present invention is a method and apparatus for giving a number count of discrete objects suspended in a liquid stream. It is based on the use of tubidity measurements in combination with other process and apparatus elements.

Briefly, the method comprises providing a liquid stream flowing in a conduit or pipe. Means are present for introducing the discrete objects into the stream. This means might be a mixing tank, a venturi in the pipe or conduit, or other methods. The volumetric flow rate is regulated to some steady value. By steady is meant essentially constant during the period in which counting is being done, but not necessarily constant in the sense of being some fixed value to which the apparatus is limited. Flow rate must be adequately high to maintain the objects in suspension. In the case of living aquatic animals, it must also be high enough to prevent significant backwards travel against the direction of flow.

The discrete objects of this invention are defined as anything animate or otherwise that are large enough to be easily resolvable by normal unaided human vision. They will have an average diameter not less than 0.5 millimeter and preferably not less than about 1.0 millimeter. The practical upper size limit is determined only by the geometry of the system.

The suspension of discrete objects is directed through a turbidimeter. This must be precalibrated so that the output signal corresponds to some known number throughput of the same type of object. Conventionally, turbidimeters indicate the instantaneous concentration of a suspension of very fine particles. In contrast, the present invention directs the signal from the turbidimeter into an integrator and from there into an output means. The output means compares the integrated signal with a preestablished calibration algorithm. It then provides a signal responsive to the integrated value that indicates the cumulative number of objects that have passed since some arbitrary point in time.

Means may optionally be present to direct the output stream to one of a series of object receivers after some specific count has been reached.

It is thus one object of the invention to provide a method and apparatus for simply and accurately counting discrete small objects suspended in a liquid stream.

It is a further object to supply a method and apparatus suitable for counting small aquatic animals without inducing trauma or mortality.

It is yet another object to provide a method and apparatus for counting small aquatic animals that is much more rapid and as accurate as hand counting.

It is also an object to provide a method and apparatus that can receive discrete small objects suspended in a liquid stream and count them into batches of predetermined size based on number count.

These and other objects and advantages will become apparent upon reading the following detailed description and upon reference to the drawings.

DETAILED DESCRIPTION OF THE PREFERRED EMBODIMENTS

The method and apparatus of the present invention will now be described in detail. For the sake of example it will be assumed that the objects being counted are post-larval stage shrimp. Reference will frequently be made to the attached drawings.

Figure 1:
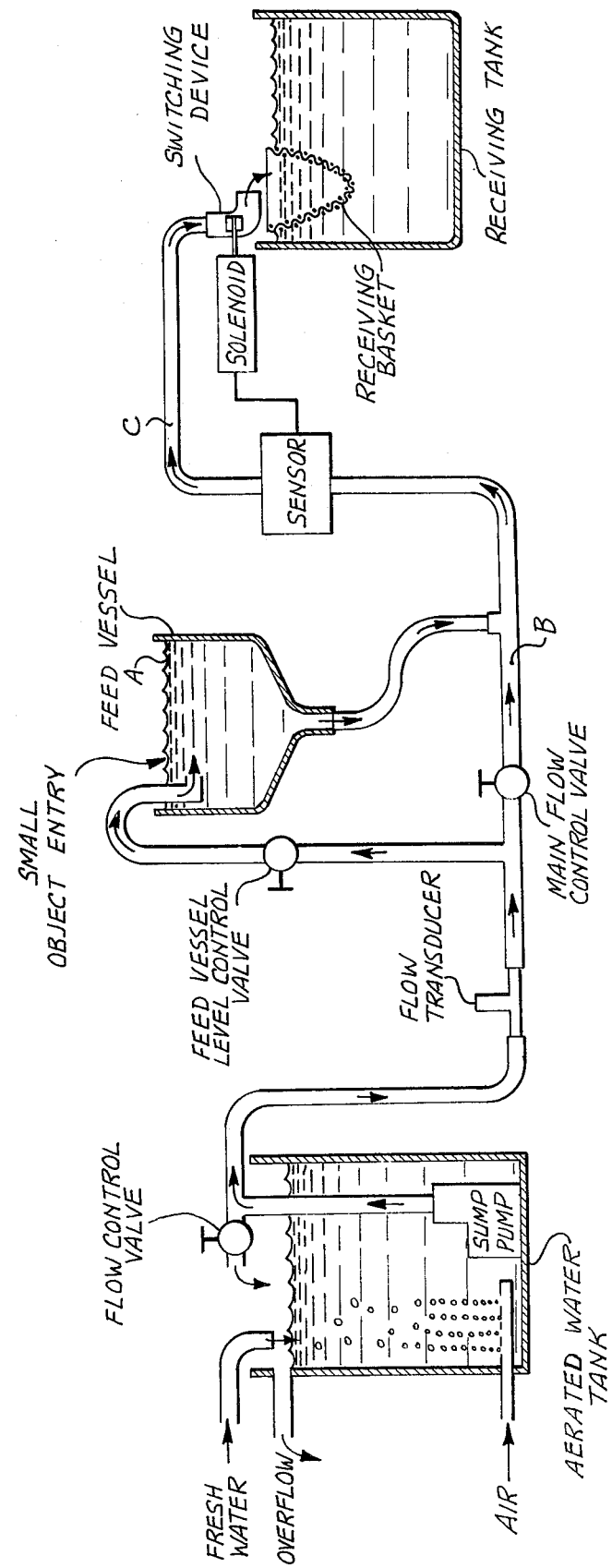
FIG. 1 is a descriptive, partially pictorial flow diagram in which major fluid vessels are represented in cross-sectional views.

The invention assumes the availability of a source of fluid, typically fresh-or saltwater, in which the objects being measured can be transported. In the case of post-larval shrimp and other living objects, it is desirable for the water to be aerated to ensure an adequate dissolved-oxygen level. As shown in FIG. 1, the source in the present description is a constant level tank which continually receives fresh makeup water to replace that which is pumped through the system. Any kind of pump is suitable or if sufficient vertical height is available, gravity feed may be used from the aerated water tank. A common sump pump having a capacity of approximately 75 liters per minute has been found to be quite suitable for the application being described. The flow rate may be adjusted to the desired level by a flow control valve which simply bypasses a portion of the pumped liquid back into the aerated water tank. A flow transducer is located downstream from the pump. Since the system is not normally carrying solids at this point, any conventional type of transducer may be used. In the embodiment shown, the liquid stream is split downstream from the flow transducer. A first portion of the liquid is piped directly to the turbidity sensor. A second portion of the liquid stream is led through a level-control valve to a circular feed vessel. Desirably, the fluid line enters this vessel tangentially so as to create a swirling or vortexing type of flow. The vortexing action should not be so severe as to entrap air, however. The objects to be counted are introduced into the feed vessel. In the case of post-larval shrimp the crustaceans are merely netted from a holding tank and immediately transferred into the feed vessel. This is desirably of a generalized conical shape, although this is not essential. A vessel form that has been found to be very satisfactory has a short, cylindrical top portion with a conical bottom. The feed vessel shown has a flexible outflow line which is feed back into the line carrying the first or primary portion of the liquid. A valve upstream from this tee, but downstream from the point at which the flow was split, is desirable to introduce a pressure drop into the system to aid in balancing flow rates. From this point the liquid stream, now carrying the objects to be measured, passes through a turbidity sensor. A number of suitable devices are commercially available to serve this function. One such device is the Model 260 Fluid Analyzer supplied by Gam Rad, Inc. of Novi, Mich. In this instrument a light beam is directed through the liquid as it passes through a square cross section measuring cell. A receiving photocell is oriented 90 degrees to the light beam. This cell is sensitive to light scattered by turbidity causing particles transported in the liquid stream.

Figure 2:
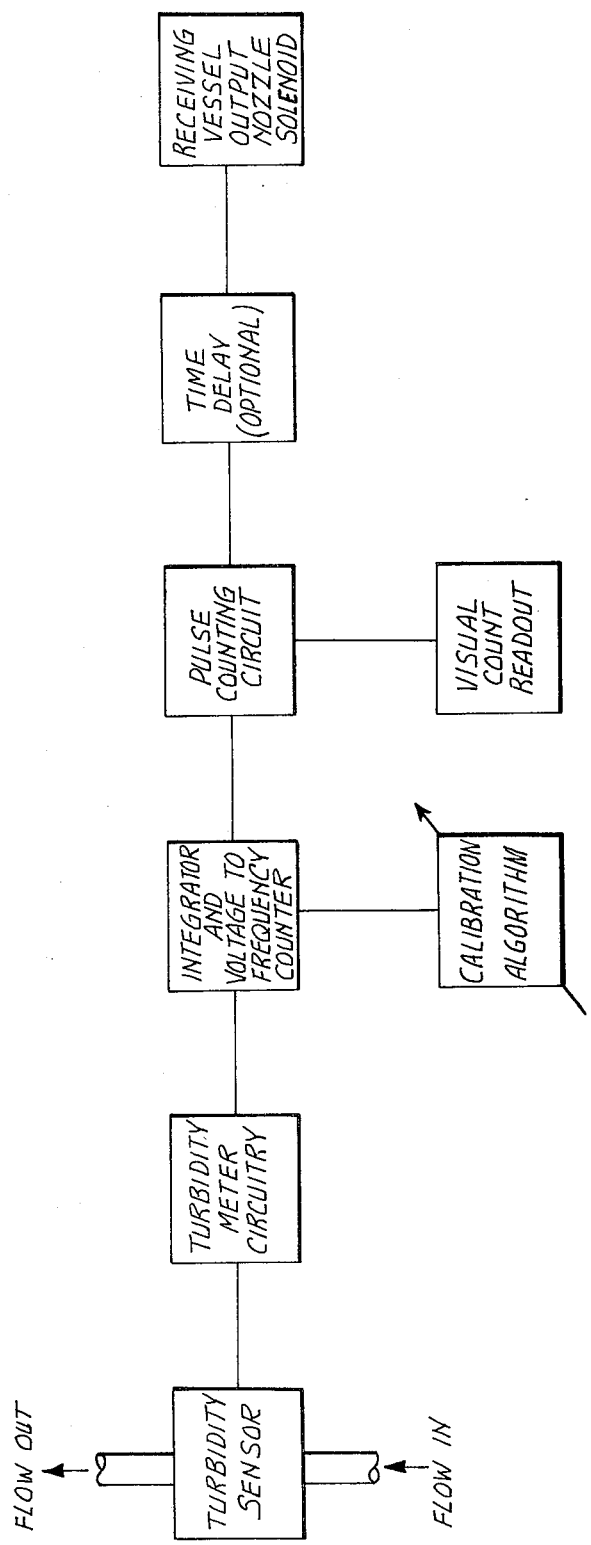
FIG. 2 is a block diagram showing the major electronic circuit components.

The output of the turbidity sensor is conveniently expressed as, or converted to, a series of voltage pulses. Output voltage is accumulated in an integrator which is followed by a voltage to frequency converter having a pulse output, as shown in FIG. 2. The voltage/frequency converter is tied to an output means which may have a number of forms. One that will normally be present is a digital counter which displays the number of objects that have passed the sensor since the beginning of the count. In the particular example shown in the drawing the sensor is also tied to a solenoid which controls the position of an output nozzle. The output nozzle directs the liquid flow containing the small objects into a receiving basket. Once a given count of the objects has been obtained the output device can signal a solenoid to shift the output nozzle to a new receiving basket. The receiving basket will normally be in the form of a mesh fine enough to retain all of the counted objects. This is at least partially immersed in a receiving tank. The excess liquid accumulating in the receiving tank may either be sewered or recycled to the aerated water tank.

Before the system can be put into use, the turbidity analyzer must first be calibrated. This is done by flowing a liquid containing a known number of discrete objects through the meter. The output from the meter is normally a voltage which varies with the number of the objects passing through the measuring cell at any instant in time. This output voltage is accumulated in an integrator. Since most turbidity meters are sensitive to flow rate, calibration curves may need to be made for each flow rate at which the system will be operated and for each specific type of object that will be counted. Flow rate should be maintained essentially constant while measurement is proceeding. Normally, it is considered good operating procedure to empirically determine a preferred flow rate and then routinely operate at this level.

During a calibration run, the number of pulses from the voltage to frequency converter is a measure of the known number of discrete objects that have passed through the counter. This can readily be converted to a calibration algorithm for that particular type of object. When making an actual counting run, the calibration is first set into the counting circuit. This is compared with the voltage on the integrator to indicate the actual number of discrete objects that have passed through the system to any point in time.

In the case of post-larval shrimp, a system flow rate of about 75 liters per minute appears to be optimal in the system described here. Two-inch pipe is conveniently used up to the turbidity sensor. It is apparent in this example that the liquid head between points A and B must be sufficiently higher than the pressure at point B so that adequate flow will occur through the outlet line. The level at point C must obviously be below point A as well. For post-larval shrimp the outlet line is conveniently flexible tubing approximately ¾ inch in diameter. The height AB is approximately 1.5 meters. The main flow control valve can be used to induce sufficient pressure drop in the primary water stream in order to ensure a positive outflow from the feed vessel. While the flow rate in the outlet line normally is not critical, it must be high enough to prevent settling of the entrained objects. In the case of living objects such as post-larval shrimp, velocity must also be high enough to prevent upward movement of the small creatures. It appears to be the nature of many aquatic animals to rather peacefully travel with rising flows but to oppose travel in a decending flow. For post-larval shrimp a minimum flow velocity of approximately 15 centimeters per second is required to reliably entrain the creatures and prevent backward travel. Preferably, the velocity should be about twice this value at any point in the line where shrimp are present in the system. The minimum flow velocities are not as important where the objects being handled are not free-swimming. Fish eggs would represent such an example. Because of the tendency to travel with rising flows, accuracy is improved with post-larval shrimp with a vertical flow through the turbidimeter.

When properly calibrated, the equipment will give counts that are generally within ±5 percent of carefully hand-counted batches. In one test of five batches the following results were obtained:

| Instrument Count | Hand Count |
| --- | --- |
| 1051 | 1060 |
| 1100 | 1060 |
| 997 | 1060 |
| 1112 | 1060 |

| Instrument Count | Hand Count |
| --- | --- |
| 949 | 1000 |

Having thus described one example of the object counting method and apparatus, it should be evident that many modifications can be made without departing from the spirit of the present invention.

I claim:

1. A method for counting suspended discrete small objects carried in a liquid stream which comprises:
   a. splitting a liquid stream into primary and secondary streams;
   b. introducing the objects into the moving secondary liquid stream, said stream having sufficient velocity to prevent settling or back movement;
   c. recombining the primary and secondary streams;
   d. maintaining the moving stream at a steady flow rate;
   e. measuring turbidity of the stream containing the objects;
   f. establishing a calibration algorithm of turbidity measurement versus number count of the objects for a given increment of time;
   g. integrating the turbidity measurement over time and comparing the integrated value with the calibration algorithm;
   h. providing an output signal responsive to the integrated value that indicates the number of individual objects that have passed the turbidity counter within a given time period.

2. The method of claim 1 in which the secondary stream exits into a vessel open to the atmosphere which can receive the discrete small objects.

3. The method of claim 2 in which the secondary stream exits tangentially into the vessel which is generally of conical shape in order to create a vortexing flow pattern.

4. The method of claim 1 in which the liquid stream exists from the system through a nozzle that is automatically shifted between object receiving containers in response to a predetermined object count.

5. The method of claim 4 in which a time-delay system functions between the turbidity meter and the nozzle shifting means to accommodate transit time after the predetermined count has been reached so that the nozzle is not shifted until a full count of objects has been deposited in the receiving container.

6. The method of claim 4 where the counter is automatically returned to zero after the predetermined count has been reached.

7. The method of claim 1 in which the discrete small objects have a minimum effective diameter of 0.5 millimeter.

8. The method of claim 7 in which the objects are post-larval stage shrimp.

9. The method of claim 7 in which the objects are fish.

10. The method of claim 7 in which the objects are the eggs of aquatic animals.

11. An apparatus for counting suspended discrete small objects carried in a liquid stream which comprises:
    a. means for splitting the liquid stream into primary and secondary liquid streams;
    b. means for introducing the objects into the secondary liquid stream;
    c. means for recombining the primary liquid stream with the secondary stream containing the discrete objects;
    d. means for maintaining the combined streams at a steady flow rate of sufficient velocity to prevent settling or back-movement of the objects;
    e. turbidity measuring means responsive to changes in light scattering characteristics of the stream caused by the presence of the discrete objects;
    f. counting means which further comprises integrating means for converting the signal from the turbidity meter measuring means into a cumulative count of objects passing the turbidity measuring means in a given time interval, and
    g. output means for signalling this cumulative count.

12. The apparatus of claim 11 including a single conduit means carrying the incoming liquid stream, said conduit means being divided into two conduits one of which carries a first stream of the flow and the other which carries a second stream, means for introducing the discrete small objects into the second stream conduit, and means by which the first and second stream conduits are recombined into a single conduit prior to entering the turbidity measuring means.

13. The apparatus of claim 12 including a vessel open to the atmosphere, said vessel receiving the flow from the second stream conduit and also serving as an object receiving means, said vessel having an outlet conduit leading the outflow by gravity so as to recombine with the liquid in the first stream conduit.

14. The apparatus of claim 13 in which the receiving vessel is generally of conical shape and the second stream conduit enters the vessel tangentially to produce a vortexing flow.

15. The apparatus of claims 12, 13, or 14 in which valve means are present in the first and second stream conduits to regulate pressure differentials.

16. The apparatus of claim 11 which further contains shiftable outlet nozzle means responsive to the cumulative count output means so that when a given object count is reached the nozzle means moves from one receiving container to an empty receiving container.

17. The apparatus of claim 16 further in combination with time delay means to compensate for transit time between the turbidity meter and the outlet nozzle means.

* * * * *